H. W. HITCHCOCK.
ELECTRICAL MEASURING APPARATUS.
APPLICATION FILED OCT. 18, 1920.

1,419,673.

Patented June 13, 1922.

INVENTOR
Harry W. Hitchcock
BY
ATTORNEY

UNITED STATES PATENT OFFICE.

HARRY W. HITCHCOCK, OF NEW YORK, N. Y., ASSIGNOR TO AMERICAN TELEPHONE AND TELEGRAPH COMPANY, A CORPORATION OF NEW YORK.

ELECTRICAL MEASURING APPARATUS.

1,419,673. Specification of Letters Patent. Patented June 13, 1922.

Application filed October 18, 1920. Serial No. 417,763.

*To all whom it may concern:*

Be it known that I, HARRY W. HITCHCOCK, residing at New York, in the county of New York, borough of Bronx, and State of New York, have invented certain Improvements in Electrical Measuring Apparatus, of which the following is a specification.

This invention relates to electrical measuring apparatus, and especially to means for the direct determination of the resistance and the reactance components of the impedance of an electrical circuit for various frequencies.

It has been customary heretofore to determine the impedance of an electric circuit by impressing thereon an alternating current of a single known frequency and noting the magnitude of the current flowing in the circuit from which the magnitude of the impedance may be calculated. In telephone engineering investigations it has been found desirable to measure the impedance of telephone circuits at various frequencies throughout the range of voice currents; that is to say at various points from zero to 2,000 cycles. Furthermore, it is desirable to know not only the magnitude of the impedance itself, but also the magnitudes of the resistance and reactance components of the impedance.

This invention provides the method and means for determining directly the resistance and the reactance components of the impedance of a circuit at various frequencies throughout any given range.

Figure 1:
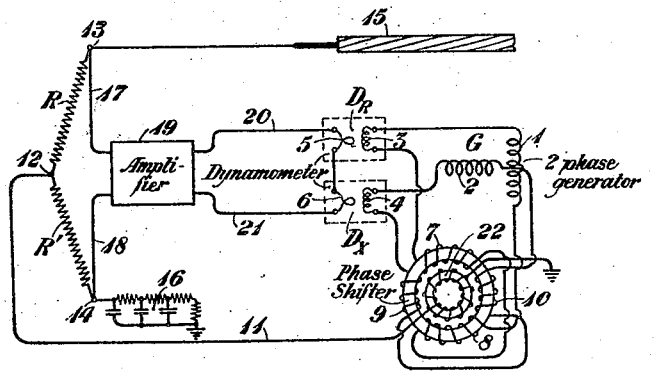
Figure 2:
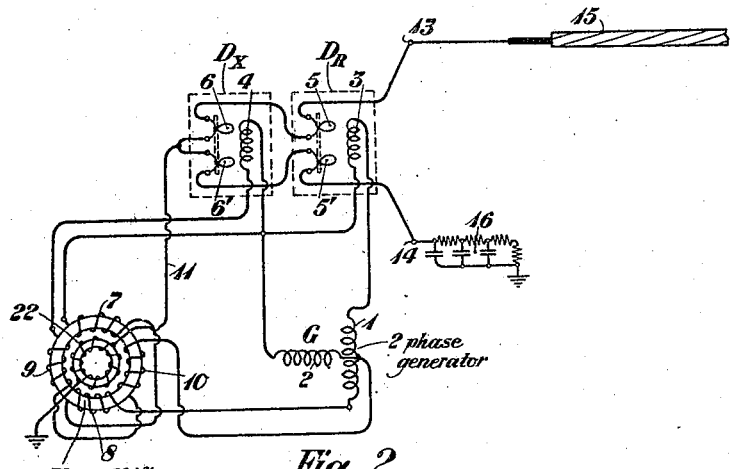
Figures 3, 3A:
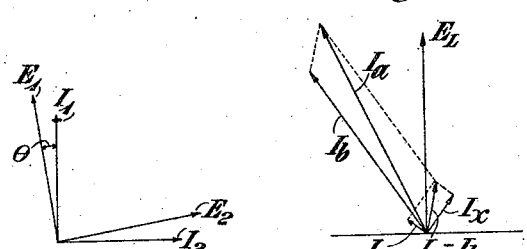
Figure 3B:
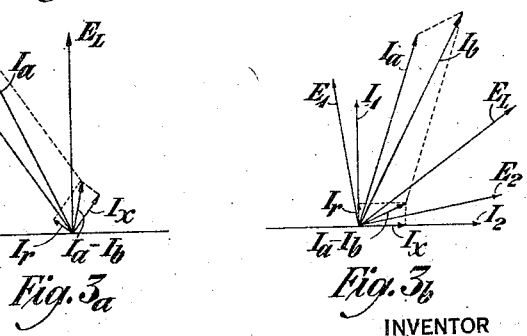

Other and further objects of this invention will be apparent from the following description when read in connection with the attached drawing of which Figure 1 shows one embodiment of the invention applied to a bridge-balance circuit having ratio arms, Figure 2 shows an embodiment of the invention employing a differential arrangement of the measuring devices which avoids the use of ratio arms, and Figures 3, $3_a$, and $3_b$, are vector diagrams showing the principle of operation of the invention.

In Fig. 1, a submarine cable 15 is connected to one of the arms of the bridge network and is designed to be balanced by the artificial line 16 connected with the other arm. In this figure two equal resistances R and R′ connected together at the point 12, form the two ratio arms of the bridge network. The submarine cable 15 is connected with the arm R at the point 13, and the artificial line 16 is connected with the arm R′ at the point 14. Bridged across the ratio arms and connected thereto by means of the conductors 17 and 18 is an amplifier 19, the output side of which is connected, by means of conductors 20 and 21, with the movable coils of two dynamometers $D_R$ and $D_X$. These movable coils, designated 5 and 6 respectively, are connected in series in the output circuit of the amplifier. The field coils 3 and 4 of the dynamometers $D_R$ and $D_X$ respectively are connected with the windings 1 and 2 respectively of a two-phase sine wave generator G. Winding 1 of the said generator is connected with the primary windings 7 and 8 of the phase shifter and similarly winding 2 of the generator is connected with the windings 9 and 10 of this said phase shifter. One side of the secondary winding 22 of the said phase shifter is grounded and the other side of the same winding is connected by means of conductor 11 to the midpoint 12 of the ratio arms R and R′.

Fig. 2 shows a modification of the arrangement shown in Fig. 1, in which differential dynamometers are used, instead of those of the simple type shown in Fig. 1, and the ratio arms R and R′ have been omitted. Like designating symbols have been used to indicate the same parts in both figures. Dynamometers $D_R$ and $D_X$ are of a differential type, having the two movable coils of each rigidly linked together and so arranged that with equal and opposite currents flowing through the two said coils no resultant deflection is produced. The secondary winding 22 of the phase shifter is connected by means of conductor 11 to the junction point of the movable windings of the dynamometer $D_X$, and the corresponding movable coils of the dynamometers $D_X$ and $D_R$ are connected in series. The respective coils are connected with the submarine cable 15 and with the artificial line 16.

In the arrangement shown in Fig. 1, it is important that the resistance R and R′ shall be of relatively large magnitude in order to facilitate the operation of the bridge, the reason for which will be made clear hereafter.

Having in mind the foregoing description of the parts of this apparatus, the invention will become clearer from the following description of its mode of operation: Let it be assumed that the two-phase generator G, shown in Fig. 1, is producing the voltages $E_1$ and $E_2$ ninety degrees apart, as shown in Fig. 3, and due to the reactance of the circuit the currents $I_1$ and $I_2$ set up therein lag behind the voltages by a phase angle $\Theta$. The currents $I_1$ and $I_2$ flowing through the field windings of the phase shifter will set up in the secondary winding 22 a voltage which is indicated by $E_L$ in Fig. $3_a$. This voltage $E_L$ is applied to the midpoint of the ratio arms R and R', and the current resulting therefrom will flow through the cable and through the artificial line to ground. Let it be assumed that the current flowing through the resistance R and the submarine cable is represented by the vector $I_a$ and that flowing through R' and the artificial line be represented by the vector $I_b$. If the impedances of the cable and artificial line are the same $I_a$ and $I_b$ will be exactly equal in magnitude and phase. Any vector difference in these two currents will be due to a difference in impedance in these two circuits since R and R' are equal. In Figs. $3_a$ and $3_b$ it has been assumed that these currents differ by an amount $I_a - I_b$. As R and R' are equal and are pure resistances the vectors $I_a$ and $I_b$ may be assumed to represent the potentials 12—13 and 12—14 while $I_a - I_b$ may represent the potential difference between points 13 and 14 or that which is impressed upon the amplifier. As the latter may be assumed to be distortionless $I_a - I_b$ may represent the amplifier output current flowing in the moving coils 5 and 6 of the two dynamometers $D_R$ and $D_X$. This current $I_a - I_b$ may be resolved into two components $I_r$ and $I_x$ in quadrature. $I_r$ has a phase with respect to $E_L$ such as would be produced in case the impedance difference between the cable and the artificial line were a pure resistance. Similarly a pure reactance impedance difference would produce a current difference having the same phase position as $I_x$.

Prior to measuring the impedance unbalance of the circuit in question the phase shifter must be adjusted so that if the unbalance between the circuits 15 and 16 is pure resistance a current flowing from the secondary thereof will cause maximum deflection in the dynamometer $D_R$ and zero deflection in the dynamometer $D_X$, or in other words, adjusted so that a current flowing through the loops 5 and 6 will be in phase with that in coil 3 and 90 degrees out of phase with that in coil 4. Similarly, if the unbalance is pure reactance the phase shifter is adjusted so that no deflection occurs in the dynamometer $D_R$ and maximum deflection occurs in the dynamometer $D_X$. Such preliminary adjustment of the phase shifter may be effected by substituting for the circuits 15 and 16 two unbalanced resistances and setting the shifter at the point which causes maximum deflection of the dynamometer $D_R$ and zero deflection of $D_X$. The circuits 15 and 16 should then be connected to the bridge arms at the points 13 and 14 and the potential of the secondary 22 of the phase shifter should be applied to the midpoint of the bridge arms.

The relationship of the various currents and voltages will be as shown in Fig. $3_b$. In this figure the vector current $I_r$ is in phase with the current $I_1$, which flows through the field coil 3 of the dynamometer $D_R$, and the reactance component $I_x$ is in phase with the current $I_2$ which flows through the field coil 4 of the dynamometer $D_X$. The currents $I_r$ and $I_x$ will then cause a deflection of the coils 5 and 6 of the dynamometers $D_R$ and $D_X$ proportional to the resistance and the reactance components respectively. By operating the generator G at various frequencies throughout the desired range the corresponding resistance and reactance components of the impedance at each of said frequencies may be readily determined by means of the arrangement shown in this figure, and suitable impedance-frequency characteristic curves may be prepared by the data obtained.

It has been stated heretofore that the resistances R and R' shall be relatively large in order that efficient operation of the network may be obtained, that is, R and R' must be large to avoid a readjustment of the phase shifter after it has been adjusted to give the maximum deflection of the dynamometers for either the pure resistance or pure inductance unbalance. The system is dependent for accurate operation upon the magnitude and phase of the currents flowing through the bridge arms. If the resistances of the bridge arms are not only quite large but also constitute a large percentage of the total resistance of the circuits, and furthermore, these resistances are large in comparison with the inductance of the circuits, a single adjustment of the phase shifter will suffice for determining the resistance and reactance unbalance between two impedances because the phase angle between the voltage of the secondary of the phase shifter and the resulting current will not change when the circuits 15 and 16 are connected to the bridge arms after the said adjustment has been made by using pure resistance or pure inductance unbalance.

In the arrangement shown in Fig. 2, two differential dynamometers have been used and the ratio arms have been omitted. When the impedance of the line 15 and of the artificial line 16 are equal, neither dynamometer will show a deflection, since the currents in the two opposing movable coils of each dynamometer which are mounted upon the same spindle are equal. If an impedance unbalance exists between the cable 15 and the artificial line 16, the current flowing through the coils 5 and 6 in series will be different from that flowing through the coils 5' and 6' in series, and a deflection will occur in either or both of said dynamometers, depending upon whether the unbalance is due to resistance alone or reactance alone, or due jointly to resistance and reactance.

It will be seen that, by means of the arrangements shown in Figs. 1 and 2, the nature and the magnitude of unbalance in a circuit may readily be determined for a plurality of frequencies. Since the frequency range which it is desired to measure in telephone work extends from zero to 2,000 cycles, it will usually be necessary to provide more than one generator to cover the required range.

Although the phase shifting device is represented as a manually operated arrangement, it is to be understood that the invention is not to be considered to be thus limited since it is practicable to control the movement of the phase shifter by automatic as well as by manual means. Furthermore it is desirable, in order to obtain the best results, to provide means for regulating the voltage of the generator, and also means to ensure the constancy of the dynamometer field current, which may be done by means well known to those skilled in the art.

In the particular forms in which my invention is illustrated the circuit which is intended to be balanced is represented as a submarine cable. It is to be understood that this form of circuit is selected simply for the purpose of illustration and not as a limitation of the invention to this particular type of circuit. The invention may be defined to be the determination of the nature and magnitude of the impedance unbalance in any type of circuit such, for example, as a telephone, telegraph or other signaling circuit, or a power circuit or apparatus connected with such circuits, such as loading coils, etc.

Although this invention has been disclosed as having specific forms of embodiment, it is to be understood that the invention is not so limited, but is capable of other and different forms of embodiment without departing from the spirit and scope of the appended claims.

What is claimed is:

1. In an electrical measuring device, the combination with a line circuit of balancing means for approximating the characteristics of the said circuit, a source of two-phase potential adapted to produce currents of a plurality of frequencies and a plurality of instruments connected with said source and with said line circuit and balancing means designed to indicate the magnitude and the nature of the unbalance between the said line circuit and the said balancing means at various frequencies.

2. In an electrical measuring device, a combination with a line circuit of an artificial line designed to approximate the impedance of the said line circuit, a plurality of dynamometers having their movable coils connected with the said line circuit and the said artificial line and the field coil of each dynamometer connected respectively with one phase of a source of two-phase current, and means for applying a potential to the said line circuit and the said artificial line in parallel and for changing the phase relation between the said applied voltage and the currents through the said field coils, whereby the magnitudes of the components of the impedance unbalance between the said line circuit and the said artificial line may be directly determined.

3. In an electrical measuring device, the combination with a line circuit of a balancing network, two ratio arms connected with the said line circuit and the said network, a plurality of dynamometers having their movable coils serially connected across the said ratio arms and the field coil of each dynamometer connected with a different winding of a two-phase source of sinusoidal alternating current, and a phase shifting device having its primary windings connected with the said two-phase source of current and its secondary winding connected between the ground and the midpoint of the ratio arms.

4. In an electrical measuring device, the combination with two ratio arms of a line circuit and a balancing network connected therewith, an amplifier bridged across the said ratio arms, a plurality of dynamometers having their movable coils in series with the output side of the said amplifier and having the field coil of each dynamometer connected with a different phase of a source of two-phase alternating current, and a phase shifting device having a plurality of primary windings, each connected in series with a field coil and its associated source of potential and having its secondary winding connected between the ground and the midpoint of the said ratio arms.

5. In an electrical measuring device, the combination with a line circuit of balancing means for approximating the characteristics of the said circuit, a source of two-phase potential adapted to produce currents of a plurality of frequencies, means to apply current to said line and said balancing means in parallel and to control the phase of said current with respect to the other currents from said source, and a plurality of instruments connected with said source and with said line circuit and balancing means designed to indicate the magnitude and the nature of the unbalance between the said line circuit and the said balancing means at various frequencies.

6. In an electrical measuring device, the combination with a network comprising a line circuit and an artificial line approximating the characteristics of the said circuit, means for applying current to the said network, a source of multiphase current, an electro-dynamometer having movable coils connected with the said network and fixed coils, each connected with its individual phase winding of the said source of multiphase current, and means to control the phase relation of the current applied to the said network and the current applied to the said fixed coils.

7. In an electrical measuring device, the combination with a line circuit of balancing means for approximating the characteristics of the said circuit, ratio arms to correlate the said line circuit and the said balancing means, a source of potential connected with the said ratio arms, an electro-dynamometer connected effectively across the said ratio arms, a source of multiphase current effectively connected with the said dynamometer, and means to control the phase of the current applied to the said ratio arms relative to the multiphase current applied to the said dynamometer.

8. In an electrical measuring device, the combination with an impedance of a second impedance designed to simulate the said first impedance, a source of multiphase alternating potential, a phase shifting device adapted to derive a single phase alternating potential from the said multiphase source and to apply the said potential to the said impedances in parallel, and an electro-dynamometer having movable and fixed coils, the said movable coils being connected with said impedances and each of the said fixed coils being individual to and connected with one phase winding of the said source of multiphase potential.

9. In an electrical measuring device, the combination with an impedance of a second impedance designed to simulate the said first impedance, a source of multiphase alternating potential, an electro-dynamometer having its movable coils bridged across the said impedances and each fixed coil connected with its respective phase winding of the said source, and a phase shifter adapted to apply an alternating potential to said impedance and to control the phase thereof with respect to the multiphase potential from the said source.

In testimony whereof, I have signed my name to this specification this 15th day of October, 1920.

HARRY W. HITCHCOCK.